US012659841B2

(12) United States Patent
Kaikkonen et al.

(10) Patent No.: US 12,659,841 B2
(45) Date of Patent: Jun. 16, 2026

(54) CHANNEL ACCESS FOR A FREQUENCY BAND

(71) Applicant: Nokia Technologies Oy, Espoo (FI)

(72) Inventors: Jorma Johannes Kaikkonen, Oulu (FI); Sami-Jukka Hakola, Oulu (FI)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 18/552,100

(22) PCT Filed: Mar. 22, 2022

(86) PCT No.: PCT/EP2022/057447
§ 371 (c)(1),
(2) Date: Sep. 22, 2023

(87) PCT Pub. No.: WO2022/207403
PCT Pub. Date: Oct. 6, 2022

(65) Prior Publication Data
US 2025/0287290 A1     Sep. 11, 2025

Related U.S. Application Data

(60) Provisional application No. 63/167,864, filed on Mar. 30, 2021.

(51) Int. Cl.
*H04W 48/10*       (2009.01)
*H04W 56/00*       (2009.01)

(52) U.S. Cl.
CPC ......... *H04W 48/10* (2013.01); *H04W 56/001* (2013.01)

(58) Field of Classification Search
CPC ......... H04L 27/26025; H04L 27/26134; H04L 27/2647; H04L 5/0053; H04L 27/0006;
(Continued)

(56) References Cited

U.S. PATENT DOCUMENTS

2018/0227838 A1     8/2018  Hayashi et al.
2019/0037481 A1     1/2019  Zhang et al.
(Continued)

FOREIGN PATENT DOCUMENTS

WO          2021/028033 A1     2/2021
WO          WO-2022183514 A1 *  9/2022   ........... H04L 5/0048

OTHER PUBLICATIONS

"New SID: Study on supporting NR from 52.6GHz to 71 GHz", 3GPP TSG RAN Meeting #86, RP-193259, Agenda Item: 9.1.1, Intel Corporation, Dec. 9-12, 2019, 3 pages.
(Continued)

*Primary Examiner* — Awet Haile
(74) *Attorney, Agent, or Firm* — Barta Jones, PLLC

(57)          ABSTRACT

Example embodiments of the present disclosure relate generally to communications and, more particularly, to channel access for a frequency band. An apparatus detects at least one synchronization signal and physical broadcast channel block during searching for a synchronization signal associated with a cell in a communication network. The apparatus determines a configuration related to whether or not a discovery burst transmission window is used for the cell. The apparatus determines, based on the configuration, whether or not the discovery burst transmission window is used for the cell. The apparatus determines at least one assumption to use when monitoring and detecting the synchronization signal and physical broadcast channel block, based on whether or not the discovery burst transmission window is used for the cell.

2 Claims, 5 Drawing Sheets

(58) Field of Classification Search
  CPC ............ H04L 27/2666; H04W 56/001; H04W
      16/14; H04W 16/28; H04W 48/10; H04W
      72/0446
  See application file for complete search history.

(56) References Cited

U.S. PATENT DOCUMENTS

| | | | |
|---|---|---|---|
| 2020/0196306 A1 | 6/2020 | Si et al. | |
| 2020/0351758 A1 | 11/2020 | Bhattad et al. | |
| 2020/0351775 A1 | 11/2020 | Larsson et al. | |
| 2020/0396703 A1 | 12/2020 | Luo et al. | |
| 2021/0136591 A1* | 5/2021 | Si | H04W 52/146 |
| 2021/0160870 A1* | 5/2021 | Si | H04L 5/0044 |
| 2022/0303925 A1* | 9/2022 | Hu | H04W 56/001 |
| 2023/0188402 A1* | 6/2023 | Qiao | H04L 27/2672 |
| | | | 375/260 |

OTHER PUBLICATIONS

"3rd Generation Partnership Project; Technical Specification Group Radio Access Network; Study on supporting NR from 52.6 GHz to 71 GHz (Release 17)", 3GPP TR 38.808, V1.0.0, Dec. 2020, 154 pages.

"Revised WID: Extending current NR operation to 71 GHz", 3GPP TSG RAN Meeting #90-e, RP-202925, Agenda Item: 9.8.2, CMCC, Dec. 7-11, 2020, 6 pages.

"LS on the maximum/minimum channel bandwidth and channelization for NR operation in 52.6 to 71 GHz", 3GPP TSG RAN WG1 Meeting #104-e, R1-2102128, RAN1, Jan. 25-Feb. 5, 2021, 2 pages.

"3rd Generation Partnership Project; Technical Specification Group Radio Access Network; Physical layer procedures for shared spectrum channel access (Release 16)", 3GPP TS 37.213, V16.4.0, Dec. 2020, pp. 1-26.

"3rd Generation Partnership Project; Technical Specification Group Radio Access Network; Study on Licensed-Assisted Access to Unlicensed Spectrum; (Release 13)", 3GPP TR 36.889, V13.0.0, Jun. 2015, 285 pages.

"3rd Generation Partnership Project; Technical Specification Group Radio Access Network; NR; Physical layer procedures for control (Release 16)", 3GPP TS 38.213, V16.4.0, Dec. 2020, pp. 1-181.

"3rd Generation Partnership Project; Technical Specification Group Radio Access Network; NR; Physical channels and modulation (Release 16)", 3GPP TS 38.211, V16.4.0, Dec. 2020, pp. 1-133.

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network; NR; Requirements for support of radio resource management (Release 17)", 3GPP TS 38.133, V17.0.0, Dec. 2020, 1812 pages.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.0.0, Dec. 2020, pp. 1-180.

"Summary #4 of email discussion on initial access aspect of NR extension up to 71 GHz", 3GPP TSG RAN WG1 Meeting #104-e, R1-2101971, Agenda item: 8.2.1, Intel Corporation, Jan. 25-Feb. 5, 2020, pp. 1-197.

"RAN4 UE features list for Rel-16", 3GPP TSG-RAN WG4 Meeting # 95-e, R4-200XXXX, Agenda item: 7, NTT Docomo, Inc., May 25-Jun. 5, 2020, pp. 1-51.

International Search Report and Written Opinion received for corresponding Patent Cooperation Treaty Application No. PCT/EP2022/057447, dated Jul. 11, 2022, 12 pages.

"Session notes for 8.2 (Study on supporting NR from 52.6 GHz to 71 Ghz)", 3GPP TSG-RAN WG1 Meeting #104-e, R1-2102192, Agenda item: 8.2, Ericsson, Jan. 25-Feb. 5, 2021, 14 pages.

"Extending 8 SSB support to the TDD bands with newly introduced 30 kHz Case C SSB pattern", 3GPP TSG RAN Meeting #89-e, RP-201716, Nokia, Sep. 14-18, 2020, 4 pages.

* cited by examiner

200

| Ref | | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|---|
| 202 | SLOT INDEX #n | 0 | | 1 | | 2 | | 3 | | 4 | | 5 | | 6 | | 7 | | 8 | | 9 | |
| 204 | 2 MSBs OF SSB INDEX (PBCH) | 00 | | | | | | | | 01 | | | | | | | | 10 | | | |
| 206 | 3 LSBs OF SSB INDEX (PBCH DMRS SEQ) | 0 | 1 | 2 | 3 | 4 | 5 | 6 | 7 | 0 | 1 | 2 | 3 | 4 | 5 | 6 | 7 | 0 | 1 | 2 | 3 |
| 208 | SSB INDEX | 0 | 1 | 2 | 3 | 4 | 5 | 6 | 7 | 8 | 9 | 10 | 11 | 12 | 13 | 14 | 15 | 16 | 17 | 18 | 19 |
| 210 | Q=1 BEAM INDEX | 0 | 0 | 0 | 0 | 0 | 0 | 0 | 0 | 0 | 0 | 0 | 0 | 0 | 0 | 0 | 0 | 0 | 0 | 0 | 0 |
| | Q=2 BEAM INDEX | 0 | 1 | 0 | 1 | 0 | 1 | 0 | 1 | 0 | 1 | 0 | 1 | 0 | 1 | 0 | 1 | 0 | 1 | 0 | 1 |
| | Q=4 BEAM INDEX | 0 | 1 | 2 | 3 | 0 | 1 | 2 | 3 | 0 | 1 | 2 | 3 | 0 | 1 | 2 | 3 | 0 | 1 | 2 | 3 |
| | Q=8 BEAM INDEX | 0 | 1 | 2 | 3 | 4 | 5 | 6 | 7 | 0 | 1 | 2 | 3 | 4 | 5 | 6 | 7 | 0 | 1 | 2 | 3 |

300

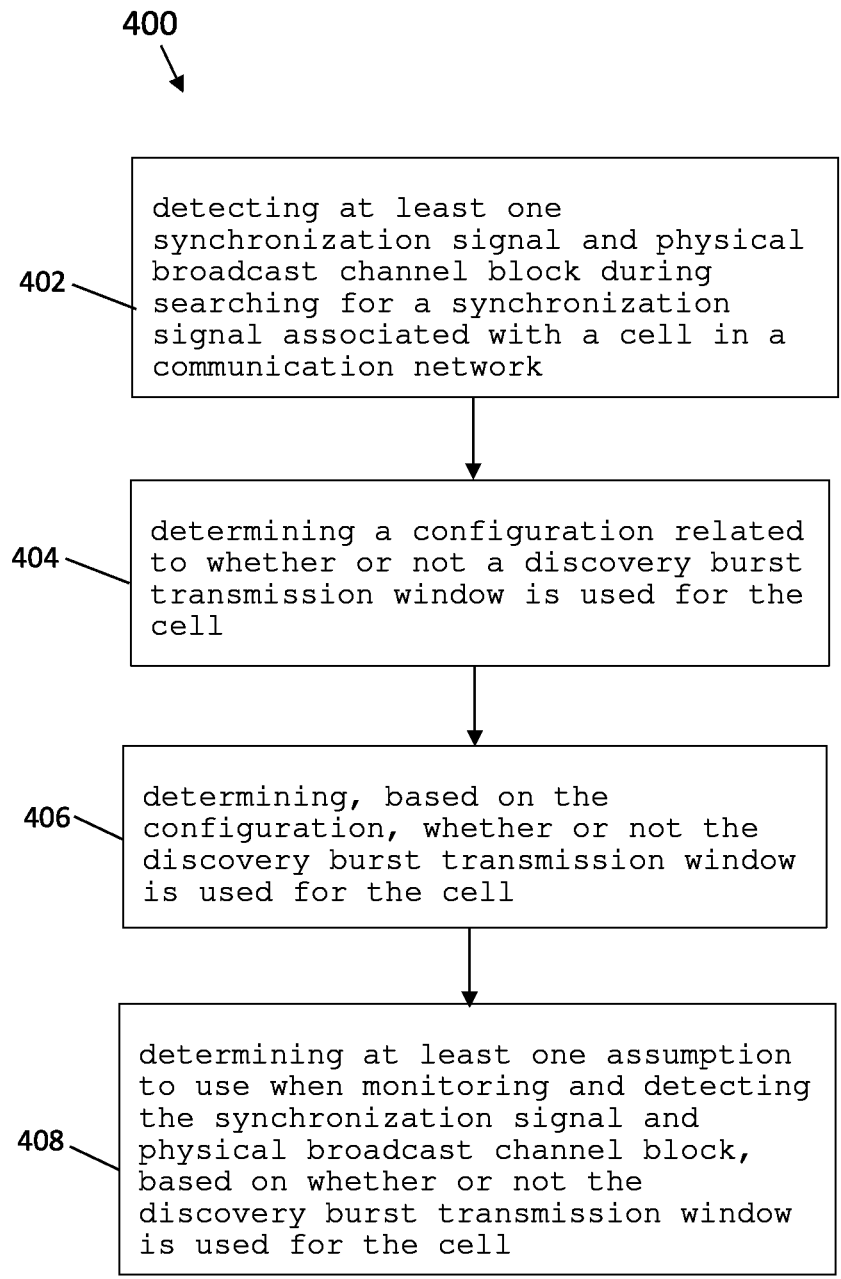

400

402 — detecting at least one synchronization signal and physical broadcast channel block during searching for a synchronization signal associated with a cell in a communication network 404 — determining a configuration related to whether or not a discovery burst transmission window is used for the cell 406 — determining, based on the configuration, whether or not the discovery burst transmission window is used for the cell 408 — determining at least one assumption to use when monitoring and detecting the synchronization signal and physical broadcast channel block, based on whether or not the discovery burst transmission window is used for the cell

FIG. 4

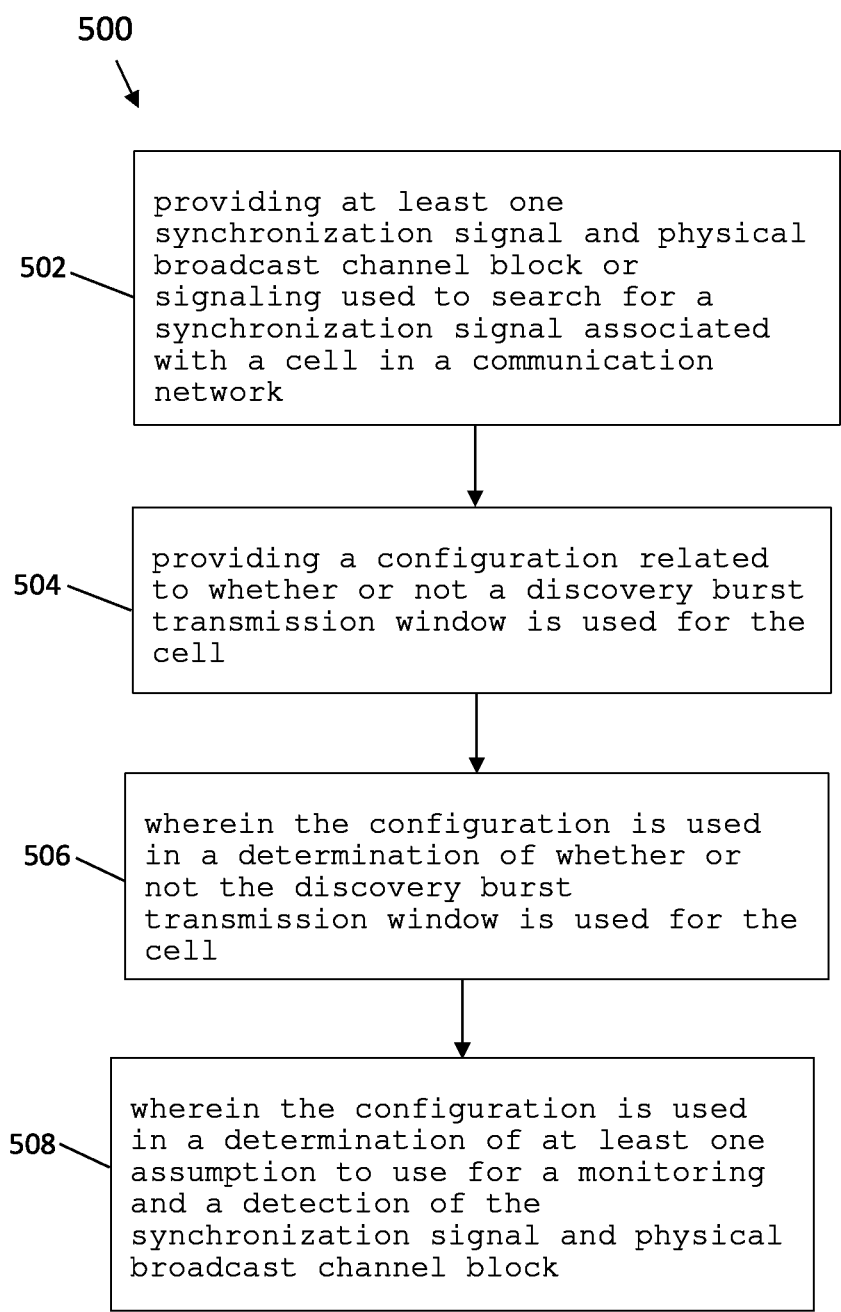

500

502 — providing at least one synchronization signal and physical broadcast channel block or signaling used to search for a synchronization signal associated with a cell in a communication network 504 — providing a configuration related to whether or not a discovery burst transmission window is used for the cell 506 — wherein the configuration is used in a determination of whether or not the discovery burst transmission window is used for the cell 508 — wherein the configuration is used in a determination of at least one assumption to use for a monitoring and a detection of the synchronization signal and physical broadcast channel block

FIG. 5

CHANNEL ACCESS FOR A FREQUENCY BAND

RELATED APPLICATION

This application was originally filed as PCT Application No. PCT/EP2022/057447 on 22 Mar. 2022, which claims priority from U.S. provisional Application No. 63/167,864, filed on 30 Mar. 2021, each of which is incorporated herein by reference in its entirety.

TECHNICAL FIELD

The examples and non-limiting embodiments relate generally to communications and, more particularly, to channel access for a frequency band.

BACKGROUND

It is known to synchronize communications of a user equipment in a communication network.

BRIEF DESCRIPTION OF THE DRAWINGS

The foregoing aspects and other features are explained in the following description, taken in connection with the accompanying drawings.

FIG. 4 is a method to implement facilitating adaptive discovery burst time window configuration, based on the examples described herein.

FIG. 5 is another method to implement facilitating adaptive discovery burst time window configuration, based on the examples described herein.

DETAILED DESCRIPTION OF EXAMPLE EMBODIMENTS

Figure 1:
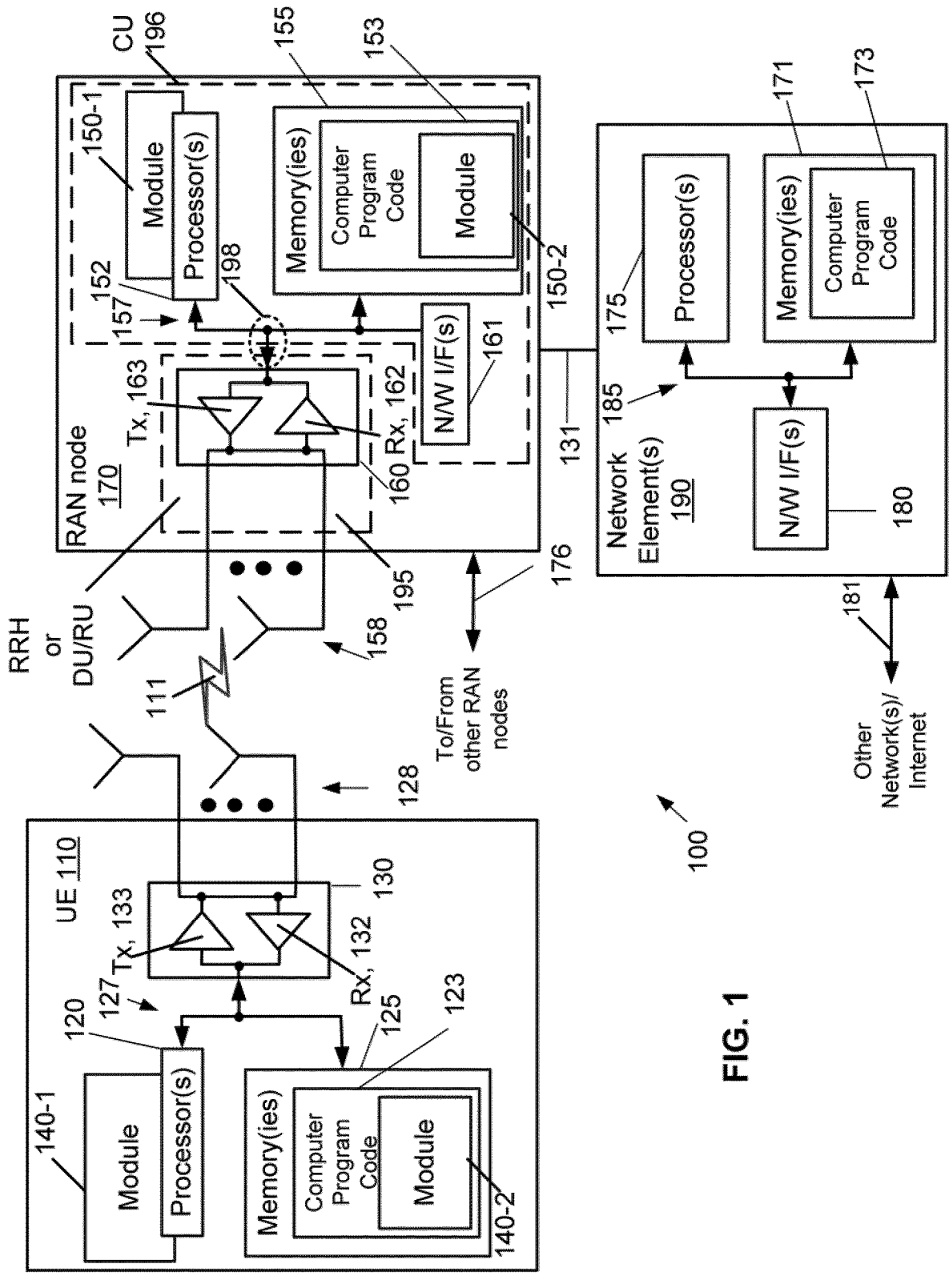
FIG. 1 is a block diagram of one possible and non-limiting system in which the example embodiments may be practiced.

Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface (such as connection 131) to a 5GC (such as, for example, the network element(s) 190). The ng-eNB is a node providing E-UTRA user plane and control plane protocol terminations towards the UE, and connected via the NG interface (such as connection 131) to the 5GC. The NG-RAN node may include multiple gNBs, which may also include a central unit (CU) (gNB-CU) 196 and distributed unit(s) (DUs) (gNB-DUs), of which DU 195 is shown. Note that the DU 195 may include or be coupled to and control a radio unit (RU). The gNB-CU 196 is a logical node hosting radio resource control (RRC), SDAP and PDCP protocols of the gNB or RRC and PDCP protocols of the en-gNB that control the operation of one or more gNB-DUs. The gNB-CU 196 terminates the F1 interface connected with the gNB-DU 195. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by gNB-CU 196. One gNB-CU 196 supports one or multiple cells. One cell is supported by only one gNB-DU 195. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memory(ies) 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that the description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include location management functions (LMF(s)) and/or access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. Such core network functionality may include SON (self-organizing/optimizing network) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, non-transitory memory, transitory memory, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, head mounted displays such as those that implement virtual/augmented/mixed reality, as well as portable units or terminals that incorporate combinations of such functions.

UE 110, RAN node 170, and/or network element(s) 190, (and associated memories, computer program code and modules) may be configured to implement (e.g. in part) the methods described herein, including facilitating adaptive discovery burst time window configuration. Thus, computer program code 123, module 140-1, module 140-2, and other elements/features shown in FIG. 1 of UE 110 may implement user equipment related aspects of the methods described herein. Similarly, computer program code 153, module 150-1, module 150-2, and other elements/features shown in FIG. 1 of RAN node 170 may implement gNB/TRP related aspects of the methods described herein. Computer program code 173 and other elements/features shown in FIG. 1 of network element(s) 190 may be configured to implement network element related aspects of the methods described herein.

Having thus introduced a suitable but non-limiting technical context for the practice of the example embodiments, the example embodiments are now described with greater specificity.

Disclosed herein is a method of facilitating adaptive discovery burst time window (DBTW) configuration. In one embodiment, synchronization raster positions in frequency are allocated separately for a case DBTW is used and for the case the DBTW is not used for synchronization signal and physical broadcast channel blocks (SS/PBCH blocks, or just SSBs). The synchronization signal and physical broadcast channel (SSB) blocks may carry a configuration for a control resource set 0 (CORESET #0). A UE determines based on the synchronization raster position where it detected the SSB whether or not DBTW is used in a cell. In another embodiment, certain SSB to CORESET #0 starting physical resource block (PRB) offsets are associated to the case that DBTW is enabled and certain offsets are associated to the case that DBTW is not used for the SSBs. The UE determines based on a read offset in the physical broadcast channel (PBCH) of the detected SSB whether or not DBTW is used. In an alternative embodiment, k_SSB offset values in PBCH are determined so that a certain subset of k_SSB values are used to indicate the need to apply DBTW. In one further embodiment, a CORESET #0 (CORESET for Type0-PDCCH) configuration index signaled in the PBCH is associated either to DBTW in use or to DBTW not in use. The UE would then determine from the configuration index whether or not DBTW is applied in the detected cell. In one additional embodiment, a half-frame indication is omitted for certain frequency band operation (such as licensed or unlicensed bands) and the locations of the SSBs are always assumed to fall within the predetermined half-frame, such as a first half-frame. Then the half-frame bit in the PBCH payload is adapted to indicate whether DBTW is used or not. In one additional embodiment, the sub-carrier spacing of the broadcast system information, such as SIB1 and paging, is assumed fixed so that sub-carrier spacing of the SSB determines the sub-carrier spacing of the sub-carrier spacing of the broadcast system information and the common sub-carrier indication is omitted from the MIB for NR operation in a certain frequency band/range, such as the 52.6 GHz to 71 GHz range. Then the common sub-carrier spacing indication bit in the PBCH payload is adapted to indicate whether DBTW is used or not. In one additional embodiment, the physical cell ID is adapted to indicate whether DBTW is used or not, so that a subset of physical cell IDs is assigned to the case when DBTW is used. In one additional embodiment, the PSS (primary synchronization signal) and/or SSS (secondary synchronization signal) sequences are adjusted to indicate whether DBTW is used or not, so that for example a SSS sequence generation is adapted to account for DBTW use indication. Thus, an application of the examples described herein is an adaptive discovery burst time window configuration. In one additional embodiment, the above methods are additionally or alternatively used to inform the UE whether it needs to assume LBT and LBT for example for UE UL transmission such as RACH.

Features of the examples described herein include a method of facilitating adaptive discovery burst time window (DBTW) configuration. In one embodiment, a UE determines, based on a synch raster position, where it detected a SSB whether or not DBTW is used in a cell. In another embodiment, the UE determines based on the read offset in a PBCH of the detected SSB whether or not DBTW is used. In an alternative embodiment, k_SSB offset values in the PBCH are determined so that a certain subset of k_SSB values are used to indicate the need to apply DBTW. In one further embodiment, the UE would then determine from a CORESET #0 configuration index whether or not DBTW is applied in the detected cell. In one additional embodiment, a half-frame bit in the PBCH payload is adapted to indicate whether DBTW is used or not. In one additional embodiment, a common sub-carrier indication bit in the PBCH payload is adapted to indicate whether DBTW is used or not. In one additional embodiment, a UE determines based on the detected physical cell ID whether DBTW is used or not. In one additional embodiment, a UE determines based on the detected PSS and/or SSS sequence in the SSB, whether the DBTW is in use or not. In yet one additional embodiment, a UE determines based on the received remaining minimum system information (RMSI), whether the DBTW is in use or not. RMSI may be received on the PDSCH that is scheduled by the PDCCH transmitted on the resources defined by the control resource set zero. In yet another embodiment, a UE determines based on the subcarrier spacing of the detected SSB, whether the DBTW is in use or not. For example, there could be two subcarrier spacings defined for the certain frequency band, e.g. 120 kHz and 960 kHz. Then for the 120 kHz band DBTW would be used while for the 960 kHZ band DBTW would not be used (or vice versa). In one additional alternative embodiment, a UE determines based on a combination of some or all of the above methods, whether DBTW is used or not.

The examples described herein are related to 3GPP new radio (NR) operation at above 52.6 GHz and especially on the 60 GHz unlicensed band(s).

A core building block of the NR is a synchronization signal and PBCH block (SS/PBCH block or just SSB). The SSB is used e.g. for initial cell search and selection, beam (beam management) and cell (RRM) measurements, radio link monitoring (RLM) and new beam identification in a beam recovery procedure. The block consists of a primary synchronization signal (PSS), a secondary synchronization signal (SSS) and a physical broadcast channel (PBCH).

In a cell search procedure the user equipment (UE) acquires the time and frequency synchronization to a cell, and determines the physical layer cell ID. The UE does this by searching for the primary synchronization signal (PSS) and the secondary synchronization signal (SSS) and decoding the physical broadcast channel (PBCH) carried by the SS/PBCH block. Similar to other radio access systems, the UE looks for the SSs in predefined frequency locations. For initial cell selection purposes, the valid frequency locations for the SS/PBCH blocks are determined by a synchronization raster. The UE uses these locations to look for SS/PBCH blocks and system acquisition when it has not been provided any other information regarding the frequency location of the SS/PBCH blocks. For both frequency ranges, FR1 and FR2, a global synchronization raster is defined via a global synchronization channel number (GSCN), which corresponds to a given frequency position of the SS/PBCH block. The mapping between the GSCN and the actual frequency position depends on the frequency range. For FR1, to accommodate different radio frequency (RF) channel raster spacings, the GSCN maps to absolute frequency positions in a clustered manner (i.e. locations at an offset of {50, 150, 250 kHz} at every 1.2 MHz), while for FR2 the frequency locations are evenly spaced, every 1.44 MHz. For each frequency band a subset of GSCN locations are valid. The GSCN location points to the center frequency of the SS/PBCH block.

In NR the number of the physical cell identities supported is 1008. The 1008 unique physical layer cell identities is given by $$N_{ID}^{cell} = 3N_{ID}^{(1)} + N_{ID}^{(2)}$$

where $$N_{ID}^{(1)} \in \{0, 1, \ldots, 335\} \text{ and } N_{ID}^{(2)} \in \{0, 1, 2\}.$$

NR PSS is a frequency domain based BPSK M-sequence. There are three PSS sequences defined in NR. Definition for PSS sequence generation is as follows:

$$d_{PSS}(n) = 1 - 2x(m)$$

$$m = (n + 43N_{ID}^{(2)}) \bmod 127$$

$$0 \le n < 127$$

where $$x(i + 7) = (x(i + 4) + x(i)) \bmod 2$$

and $$[x(6) \ x(5) \ x(4) \ x(3) \ x(2) \ x(1) \ x(0)] = [1 \ 1 \ 1 \ 0 \ 1 \ 1 \ 0].$$

SSS is a Gold sequence of length 127. There is one polynomial with 112 cyclic shifts and the other polynomial with 9 cyclic shifts forming together 1008 different PCIDs. Definition for SSS sequence generation is as follows:

$$d_{SSS}(n) = [1 - 2x_0((n + m_0) \bmod 127)][1 - 2x_1((n + m_1) \bmod 127)]$$

$$m_0 = 15 \left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

where $$x_0(i + 7) = (x_0(i + 4) + x_0(i)) \bmod 2$$

$$x_1(i + 7) = (x_1(i + 1) + x_1(i)) \bmod 2$$

and $$[x_0(6) \ x_0(5) \ x_0(4) \ x_0(3) \ x_0(2) \ x_0(1) \ x_0(0)] = [0 \ 0 \ 0 \ 0 \ 0 \ 0 \ 1]$$

$$[x_1(6) \ x_1(5) \ x_1(4) \ x_1(3) \ x_1(2) \ x_1(1) \ x_1(0)] = [0 \ 0 \ 0 \ 0 \ 0 \ 0 \ 1].$$

The SS/PBCH block transmission supports 15 and 30 kHz subcarrier spacing options in the FR1 carrier frequency range, and 120 and 240 kHz subcarrier spacing options in the FR2 carrier frequency range. To facilitate the initial cell selection of the UE, the default subcarrierspacing(s) is/are defined for each frequency band. For all the defined frequency bands (a frequency band defines a lower frequency and an upper frequency where operating bandwidth can be occupied) at FR2, both 120 kHz and 240 kHz subcarrier spacings are supported for a SS/PBCH block. Typically, at FR1 a single subcarrier spacing option is defined per frequency band, but for a carrier frequency range in operating bands n5, n41 and n66 both 15 and 30 kHz subcarrier spacings can be used. Naturally, all the SS/PBCH blocks of the cell have the same subcarrier spacing. In addition, after obtaining access, the UE can be explicitly configured with the used SS/PBCH block subcarrier spacing and, when configured, the UE can assume that the given subcarrier spacing is applied in the set of SS/PBCH blocks sharing the same center frequency. The SS/PBCH blocks can be transmitted in certain time positions in a 5 ms half-frame. These locations are indexed, from 0 to Lmax−1, and the index is carried in the SS/PBCH block, to provide a slot level timing information. The UE can determine the 2 LSB bits, for Lmax=4, or the 3 LSB bits, for Lmax>4, of an SS/PBCH block index per half frame from a one-to-one mapping with a SS/PBCH block index and an index of the DMRS sequence transmitted in the PBCH. For Lmax=64, the UE determines the additional 3 MSB bits of the SS/PBCH block index per half frame from the PBCH payload bits.

3GPP Status

Rel-17 study item (SI) for NR from 52.6 GHz to 71 GHz (RP-193259) has been concluded and the findings have been summarized in TR 38.808 (RAN1 draft version in R1-2009849). The detailed objectives on the corresponding work item were discussed in RAN #90e (7-11 Dec. 2020) and the WID states the following objectives [RP-202925]:

Physical layer aspects including [RAN1]:

In addition to 120 kHz SCS, specify new SCS, 480 kHz and 960 kHz, and define maximum bandwidth(s), for operation in this frequency range for data and control channels and reference signals, only NCP supported.

Note: Except for timing line related aspects, a common design framework shall be adopted for 480 kHz to 960 kHz.

Time line related aspects adapted to 480 kHz and 960 kHz, e.g., BWP and beam switching timing, HARQ timing, UE processing, preparation and computation timelines for PDSCH, PUSCH/SRS and CSI, respectively.

Support of up to 64 SSB beams for licensed and unlicensed operation in this frequency range.

Supports 120 kHz SCS for SSB and 120 kHz SCS for initial access related signals/channels in an initial BWP.

Study and specify, if needed, additional SCS (240 kHz, 480 kHz, 960 kHz) for SSB, and additional SCS (480 kHz, 960 kHz) for initial access related signals/channels in initial BWP.

Study and specify, if needed, additional SCS (480 kHz, 960 kHz) for SSB for cases other than initial access.

Note: coverage enhancement for SSB is not pursued.

Specify timing associated with R17 beam-based operation to new SCS (i.e., 480 kHz and/or 960 kHz), study, and specify if needed, potential enhancement for shared spectrum operation.

Study other potential beam management enhancements for new SCS (i.e., 480 kHz and/or 960 kHz) and revisit if any enhancement is needed in RAN #91-e.

Support enhancement for PUCCH format 0/1/4 to increase the number of RBs under PSD limitation in shared spectrum operation.

Support enhancements for multi-PDSCH/PUSCH scheduling and HARQ support with a single DCI.

Note: coverage enhancement for multi-PDSCH/PUSCH scheduling is not pursued.

Support enhancement to PDCCH monitoring, e.g., blind detection/CCE budget, and multi-slot span monitoring, including potential limitation to UE PDCCH configuration and capacity related to PDCCH monitoring.

Specify support for PRACH sequence lengths (i.e. L=139, L=571 and L=1151) and study, if needed, specify support for RO configuration for non-consecutive RACH occasions (RO) in time domain for operation in shared spectrum.

Evaluate, and if needed, specify the PTRS enhancement for 120 kHz SCS, 480 kHz SCS and/or 960 kHz SCS, as well as DMRS enhancement for 480 kHz SCS and/or 960 kHz SCS.

Physical layer procedure (s) including [RAN1]:

Channel access mechanism assuming beam based operation in order to comply with the regulatory requirements applicable to unlicensed spectrum for frequencies between 52.6 GHz and 71 GHz.

Specify both LBT and No-LBT related procedures, and for No-LBT case, no additional sensing mechanism is specified.

Study, and if needed specify, omni-directional LBT, directional LBT and receiver assistance in channel access.

Study, and if needed specify, energy detection threshold enhancement.

Radio interface protocol architecture and procedures [RAN2]:

For operation in this frequency range: Introduce higher layer support of enhancements listed above that are agreed to be specified.

Core specifications for UE, gNB and RRM requirements [RAN4]:

Specify new band(s) for the frequency range from 52.6 GHz-71 GHz. The band(s) definition should include UL/DL operation and excludes ITS spectrum in this frequency range.

Specify gNB and UE RF core requirements for the band(s) in the above frequency range, including a limited set of example band combinations (see Note 1).

Specify RRM/RLM/BM core requirements.

Note 1: The WI can be completed provided requirements for at least one band combination involving a new NR-U band is specified as long as it is in line with country-specific regulatory directives.

Note 2: UEs supporting a band in the range of 52.6 GHz-71 GHz are not required to support 480 kHz SCS and 960 kHz SCS.

Note 3: The maximum FFT size required to operate the system in 52.6 GHz-71 GHz frequency is 4096, and the maximum of RBs per carrier is 275 RBs.

Note 4: the system is designed to support both single-carrier and multi-carrier operation.

Note 5: RAN plenary will decide whether new FR (e.g. FR3) shall be defined for the frequency range from 52.6 GHz-71 GHz or the existing FR2 shall be extended to cover frequency range from 52.6 GHz-71 GHz.

Particularly relevant to the examples described herein are the requirements, "Supports 120 kHz SCS for SSB and 120 kHz SCS for initial access related signals/channels in an initial BWP", "Study other potential beam management enhancements for new SCS (i.e., 480 kHz and/or 960 kHz) and revisit if any enhancement is needed in RAN #91-e", and "Specify support for PRACH sequence lengths (i.e. L=139, L=571 and L=1151) and study, if needed, specify support for RO configuration for non-consecutive RACH occasions (RO) in time domain for operation in shared spectrum".

Regarding the initial access, the following agreement was made in RAN1 #104-e related to the transmission of the SSBs in the cell:

Agreement:

For an unlicensed band that requires LBT, further study whether/how to support discovery burst (DB) and discovery burst transmission window (DBTW) at least for 120 kHz SSB SCS.

If DB supported

FFS: What signals/channels are included in DB other than SS/PBCH block.

If DBTW is supported

Support mechanism to indicate or inform that DBTW is enabled/disabled for both IDLE and CONNECTED mode UEs FFS: how to support UEs performing initial access that do not have any prior information on DBTW.

PBCH payload size is no greater than that for FR2.

Duration of DBTW is no greater than 5 ms.

Number of PBCH DMRS sequences is the same as for FR2.

The following points are additionally FFS:

How to indicate candidate SSB indices and QCL relation without exceeding limit on PBCH payload size.

Details of the mechanism for enabling/disabling DBTW considering LBT exempt operation and overlapping licensed/unlicensed bands.

Whether or not to support DBTW for SSB SCS(s) other than 120 kHz if other SSB SCS(s) are supported.

Furthermore RAN1 sent an LS to RAN4 (in R1-2102128) in which also the related aspect is discussed:

Additionally, in RAN1's understanding, RAN4 will decide channelization aspects (including but not limited to channel and sync rasters to support both licensed and unlicensed operation, channelization design flexibility to align or not align with the IEEE 802.11ad/ay channelization for supported deployment (licensed and unlicensed band, with and without potential regional regulations requiring LBT channel access mechanism), whether to support the same maximum and/or minimum channel bandwidth for licensed and unlicensed operation, and whether to allow intermediate channel bandwidth(s) between the maximum and minimum bandwidths identified) for NR operation in 52.6 GHz to 71 GHz. RAN1 would like to kindly request timely feedback from RAN4 on their decision of channelization.

Figure 2:
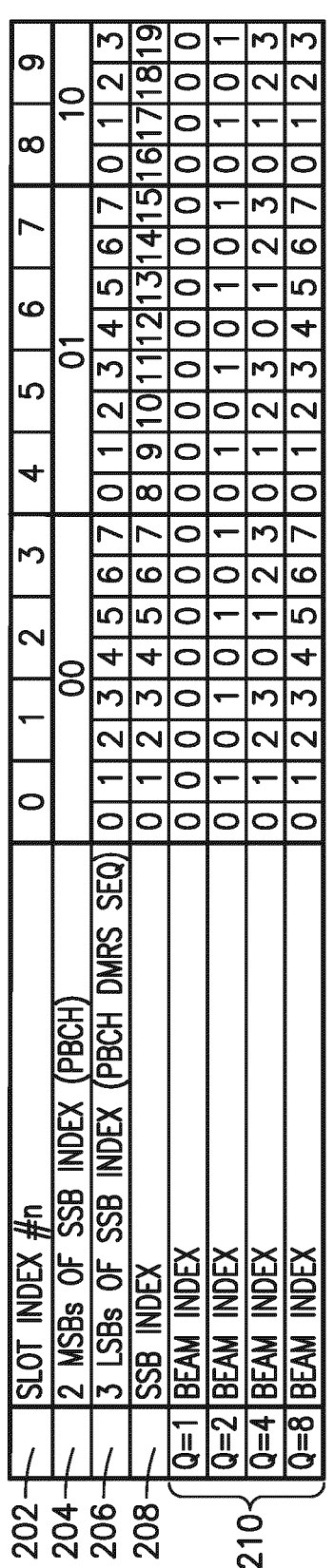
FIG. 2 shows synchronization signal and physical broadcast channel block candidate locations within 10 slots for the different number of beams (Q) in use.

DBTW refers to the window during which the SSBs may be transmitted by the cell. Rel16 NR-U defined a cycling SSB transmission scheme where for an SSB of a certain index there would be additional positions that could be used for the transmission of the SSB of the certain index if the LBT failure happened for the first position. FIG. 2 shows the SSB block candidate locations within 10 slots for a different number of beams (Q) in use in the cell with 30 kHz SCS at below the 7 GHz carrier frequency range. The UE can determine the correct SSB index/beam index from the formula mod(candidate SSB index, Q) where candidate the SSB index ranges from 0 to 19 in FIG. 2 and Q is either 1, 2, 4 or 8 and signaled to the UE in the PBCH. The formula mod(candidate SSB index, Q) is understood as the reminder after dividing "candidate SSB index" by "Q".

In case no DBTW is used, there would be only up to 8 SSB positions that are used.

Accordingly, the mapping 200 shown in FIG. 2 includes a mapping of the slot index 202, the MSBs of SSB index 204 (PBCH), the LSBs of SSB index 206 (PBCH DMRS sequence), the SSB index 208, and a number of beams (Q) 210.

LBT

LBT refers to a listen-before-talk procedure. It is a channel access method and means that a transmitter senses (measures energy on) the medium or channel before the intended transmission. If the transmitter determines that the medium is vacant (e.g. for a particular duration interval) it (the transmitter)) may start its transmission. If the transmitter determines that the medium is occupied it defers or cancels the transmission. The determining may be based on comparing the measured received energy over a certain time period and over the frequency resources against a defined energy detection threshold (ED). The determining may contain single or multiple measurements referred to as clear channel assessments (CCAs), motivating determination of multiple variants of LBT, including type 1 LBT, type 2A/B LBT, Cat. 2 LBT, Cat. 3 LBT, and Cat. 4 LBT.

In type 1 LBT (as referred to in TS37.213), the device shall measure the channel to be free for a random number of occasions before accessing the channel. The random number is uniformly distributed over a range referred to as contention window. The contention window may be adjusted based on detected channel access collisions between multiple transmissions (e.g. type 1 LBT in TS37.213 or Cat. 4 LBT in TR36.889) or the contention window may be of fixed size (Cat. 3 LBT in TR36.889).

In type 2A/B LBT (as referred to in TS37.213) or Cat. 2 LBT (as referred to in TR36.889), the device performs a single measurement (single CCA) when determining the channel occupancy.

LBT measurements are performed at least by the transmitter, but the LBT procedure may also incorporate measurements carried out at the receiver, in other words, the receiver may also monitor the channel access occupancy.

At higher carrier frequencies where narrow beams are typically used, a directional LBT may be used as a channel access method. That means that the transmitter would sense the medium or channel with a more narrow beam than with an omnidirectional or sector wide beam. The subsequent transmission is then expected to take place using the same beam as the LBT beam or a sub-beam of the LBT beam.

The examples described herein address a problem that may be stated as, the UE performing initial cell selection and subsequent initial access cannot get via configuration or dedicated signaling knowledge of whether or not DBTW is applied in the cell.

The synchronization raster for NR-U is defined in 38.101 (Rel-16) as a band n96, where applicable SS raster numbers are selected:

5.4.3.3 Synchronization Raster Entries for Each Operating Band

The synchronization raster for each band is given in Table 5.4.3.3-1. The distance between applicable GSCN entries is given by the <Step size> indicated in Table 5.4.3.3-1.

TABLE 5.4.3.3-1

| Applicable SS raster entries per operating band | | | |
|---|---|---|---|
| NR operating band | SS Block SCS | SS Block pattern[1] | Range of GSCN (First-<Step size>-Last) |
| n1 | 15 kHz | Case A | 5279-<1>-5419 |
| n2 | 15 kHz | Case A | 4829-<1>-4969 |
| n3 | 15 kHz | Case A | 4517-<1>-4693 |

TABLE 5.4.3.3-1-continued

| Applicable SS raster entries per operating band | | | |
|---|---|---|---|
| NR operating band | SS Block SCS | SS Block pattern[1] | Range of GSCN (First-<Step size>-Last) |
| [Operating band values omitted to preserve space] | | | |
| n93 | 15 kHz | Case A | 3572-<1>-3574 |
| n94 | 15 kHz | Case A | 3584-<1>-3787 |
| n96[4] | 30 kHz | Case C | 9531-<1>-10363 |

NOTE[1]:SS Block pattern is defined in clause 4.1 in TS 38.213 [8].NOTE 2:The applicable SS raster entries are GSCN = {6432, 6443, 6457, 6468, 6479, 6493, 6507, 6518, 6532, 6543}.
NOTE 3:
The following GSCN are allowed for operation in band n46: GSCN = 8996, 9010, 9024, 9038, 9051, 9065, 9079, 9093, 9107, 9121, 9218, 9232, 9246, 9260, 9274, 9288, 9301, 9315, 9329, 9343, 9357, 9371, 9385, 9402, 9416, 9430, 9444, 9458, 9472, 9485, 9499, 9513.
NOTE[4]:
The following GSCN are allowed for operation in band n96: GSCN = 9548, 9562, 9576, 9590, 9603, 9617, 9631, 9645, 9659, 9673, 9687, 9701, 9714, 9728, 9742, 9756, 9770, 9784, 9798, 9812, 9826, 9840, 9853, 9867, 9881, 9895, 9909, 9923, 9937, 9951, 9964, 9978, 9992, 10006, 10020, 10034, 10048, 10062, 10076, 10090, 10103, 10117, 10131, 10145, 10159, 10173, 10187, 10201, 10214, 10228, 10242, 10256, 10270, 10284, 10298, 10312, 10325, 10339, 10353.
NOTE 5:The applicable SS raster entries are GSCN = {5032, 5043, 5054}NOTE 6:The applicable SS raster entries are GSCN = {4707, 4715, 4718, 4729, 4732, 4743, 4747, 4754, 4761, 4768, 4772, 4782, 4786, 4793}

The interpretation of MIB content is dependent on the $k_{SSB}$ value as described in Section 54 of 38.213:

Upon detection of a SS/PBCH block, the UE determines from MIB that a CORESET for Type0-PDCCH CSS set, as described in Clause 13, is present if $k_{SSB}<24$ [4, TS 38.211] for FR1 or if $k_{SSB}<12$ for FR2. The UE determines from MIB that a CORESET for Type0-PDCCH CSS set is not present if $k_{SSB}>23$ for FR1 or if $k_{SSB}>1$ for FR2; the CORESET for Type0-PDCCH CSS set may be provided by PDCCH-ConfigCommon.

When the $k_{SSB}<12$ (for FR1) and $<24$ (for FR2), it is defined by 38.211 Section 7.4.3.1 as a sub-carrier offset to common resource block scs 0:

The quantity $k_{SSB}$ is the subcarrier offset from subcarrier 0 in common resource block $$N_{CRB}^{SSB}$$

to subcarrier 0 of the SS/PBCH block, where $$N_{CRB}^{SSB}$$

is obtained from the higher-layer parameter offsetToPointA and the 4 least significant bits of $k_{SSB}$ are given by the higher-layer parameter ssb-SubcarrierOffset and for SS/PBCH block type A the most significant bit of $k_{SSB}$ is given by $\bar{a}_{\bar{A}+s}$ in the PBCH payload as defined in clause 7.1.1 of [4, TS 38.212]. For operation with shared spectrum channel access, the 4 least significant bits of $\bar{k}_{SSB}$ are given by the higher-layer parameter ssb-SubcarrierOffset and the most significant bit of $\bar{k}_{SSB}$ is given by $\bar{a}_{\bar{A}+s}$ in the PBCH payload as defined in clause 7.1.1 of [4, TS 38.212]. If $\bar{k}_{SSB} \geq 24$, $k_{SSB}=\bar{k}_{SSB}$; otherwise, $k_{SSB}=2\lfloor\bar{k}_{SSB}/2\rfloor$. If ssb-SubcarrierOffset is not provided, $k_{SSB}$ is derived from the frequency difference between the SS/PBCH block and Point A.

When the $k_{SSB}>11$ for FR1 or $>23$ for FR2, the $k_{SSB}$ value is interpreted as described in Table 13-16 and 13-17, i.e. as an index of the GSCN where, or range where the UE may find the SSB with CORESET #0 configuration or may not find the SSB with CORESET #0 configuration, respectively.

In one embodiment, synch raster positions in frequency are allocated separately for the case DBTW is used and for the case the DBTW is not used for the SSBs. The UE determines based on the synch raster position where it detected the SSB whether or not DBTW is used in the cell. The synchronization signal and physical broadcast channel (SSB) blocks may carry a configuration for a control resource set 0 (CORESET #0).

In another embodiment, certain SSB to CORESET #0 starting PRB offsets are associated to the case where DBTW is enabled, and certain offsets (e.g. certain SSB to CORE-SET #0 starting PRB offsets) are associated to the case where DBTW is not used for the SSBs. The UE determines based on the read offset in the PBCH of the detected SSB whether or not DBTW is used.

In an alternative embodiment, k_SSB offset values in PBCH are determined so that a certain subset of k_SSB values are used to indicate the need to apply DBTW.

In one further embodiment, a CORESET #0 (CORESET for Type0-PDCCH) configuration index signaled in the PBCH is associated either to a DBTW in use or to a DBTW not in use. The UE would then then determine from the configuration index whether or not DBTW is applied in the detected cell.

In one additional embodiment, the half-frame indication is omitted for a certain frequency band operation and the locations of the SSBs are always assumed to fall within the first half-frame. Then the half-frame bit in the PBCH payload is adapted to indicate whether DBTW is used or not.

In one additional embodiment, the sub-carrier spacing of the broadcast system information, such as SIB1 and paging, is assumed fixed so that sub-carrier spacing of the SSB determines the sub-carrier spacing of the sub-carrier spacing of the broadcast system information and the common sub-carrier indication is omitted from the MIB for NR operation in the 52.6 GHz to 71 GHz range. Then the common sub-carrier spacing indication bit in the PBCH payload is adapted to indicate whether DBTW is used or not.

In one additional embodiment, the physical cell ID is adapted to indicate whether DBTW is used or not, so that a certain sub-set of physical cell IDs is assigned to the case when DBTW is used or not.

In one additional embodiment, the PSS and/or SSS sequences are adjusted to indicate whether DBTW is used or not, so that for example SSS sequence generation is adapted to account for DBTW use indication.

In one possible implementation of the first proposed embodiment, the UE is provided for the unlicensed band two synchronization rasters, where one set of synchronization raster locations is used when DBTW is used/applied, and another set of locations is used when no DBTW is used/applied, for example as shown in Table 1 below.

As used herein, references to an unlicensed band may refer to a band restricted/intended for operation with shared spectrum channel access (as defined by TS 37.213).

TABLE 1

| Applicable SS raster entries per operating band | | | | |
| --- | --- | --- | --- | --- |
| NR Operating Band | SS Block SCS | SS Block pattern[1] | DBTW | Range of GSCN (First-<Step size>-Last) |
| nxxx[2] | 120 kHz | Case D | Applied | 1641-<6>-2705 |
| | | | Not applied | 1642-<2>-2704 |

NOTE[1]:

SS Block pattern is defined in clause 4.1 in TS 38.213 [10].

NOTE[2]:

<Step size> is determined based on whether DBTW is applied or not.

In one alternative implementation of the first proposed embodiment, the used SS raster entries could be the same for both cases, but the mapping between the SSB resource element index and GSCN location is changed. For example in one case the GSCN location is in the middle of the SSB (e.g. when DBTW is applied) and in the other case the GSCN location is in the edge of the SSB (e.g. when DBTW is not applied). For example, this could be captured in the specification as follows.

The mapping between the synchronization raster and the corresponding resource element of the SS block is given in Table 2.

TABLE 2

| Synchronization raster to SS block resource element mapping | | |
| --- | --- | --- |
| DBTW is assumed to be applied | Resource element index k | 120 |
| DBTW is not assumed to be applied | Resource element index k | 124 | k is the subcarrier number of the SS/PBCH block defined in TS 38.211 clause 7.4.3.1 [9].

This effectively creates a shift between the SSB locations.

In one possible implementation of the third alternative embodiment, for operation at above 52.6 GHz and especially on the 60 GHz unlicensed band(s), the $k_{SSB}$ determines Upon detection of a SS/PBCH block, the UE determines from MIB that a CORESET for Type0-PDCCH CSS set, as described in Clause 13, is present if $k_{SSB}$<24 [4, TS 38.211] for FR1 or if $k_{SSB}$<12 for FR2. The UE determines from MIB that a CORESET for Type0-PDCCH CSS set is not present if $k_{SSB}$>23 for FR1 or if $k_{SSB}$>11 for FR2; the CORESET for Type0-PDCCH CSS set may be provided by PDCCH-ConfigCommon. For operation at shared spectrum access, for 60 GHz band operation, the UE determines that DBTW is not applied when $k_{SSB}$>14.

In one possible implementation of the fourth embodiment, for selected SSB to CORESET #0 configurations, the UE needs to assume DBTW (e.g. indexes 8 . . . 15), while for other configurations DBTW is not assumed (indexes 0 . . . 7), as illustrated in Table 3 below:

TABLE 3

Set of resource blocks and slot symbols of
CORESET for Type0-PDCCH search space set when
{SS/PBCH block, PDCCH} SCS is {120, 120} kHz

| Index | SS/PBCH block and CORESET multiplexing pattern | Number of RBs $N_{RB}^{CORSET}$ | Number of Symbols $N_{symb}^{CORSET}$ | Offset (RBs) | DBTW applied |
|---|---|---|---|---|---|
| 0 | 1 | 24 | 2 | 0 | No |
| 1 | 1 | 24 | 2 | 4 | No |
| 2 | 1 | 48 | 1 | 14 | No |
| 3 | 1 | 48 | 2 | 14 | No |
| 4 | 3 | 24 | 2 | −20 if $K_{SSB} = 0$ −21 if $K_{SBB} > 0$ | No |
| 5 | 3 | 24 | 2 | 24 | No |
| 6 | 3 | 48 | 2 | −20 if $K_{SBB} = 0$ −21 if $K_{SSB} > 0$ | No |
| 7 | 3 | 48 | 2 | 48 | No |
| 8 | 1 | 24 | 2 | 0 | Yes |
| 9 | 1 | 24 | 2 | 4 | Yes |
| 10 | 1 | 48 | 1 | 14 | Yes |
| 11 | 1 | 48 | 2 | 14 | Yes |
| 12 | 3 | 24 | 2 | −20 if $K^{SSB} = 0$ −21 if $K_{SSB} > 0$ | Yes |
| 13 | 3 | 24 | 2 | 24 | Yes |
| 14 | 3 | 48 | 2 | −20 if $K_{SSB} = 0$ −21 if $K_{SSB} > 0$ | Yes |
| 15 | 3 | 48 | 2 | 48 | Yes |

In one possible implementation of the embodiment related to adjusting the PSS and/or SSS sequences, in SSS sequence generation the definition of the cyclic shifts is adjusted as follows:

$$m_0 = 15 \left\lfloor \frac{N_{ID}^{(1)}}{112} \right\rfloor + 5N_{ID}^{(2)} + 2DBTW_{ind}^{ON}$$

where $$DBTW_{ind}^{ON} = 1, \text{ if } DBTW \text{ is used and } 0 \text{ if } DBTW \text{ is not used}$$

In one alternative implementation of the above embodiments, the method is used to indicate additionally or alternatively whether the UE needs to assume that LBT is used for UE RACH transmission or other transmissions.

In one alternative implementation of the above embodiments, a UE may, based on information whether DBTW is used in the cell or not, use different assumption for the number of possible SSB locations, SSB time locations or time window duration which SSBs may be transmitted in the cell.

In one alternative implementation of the above embodiments, a UE may, based on information whether DBTW is used in the cell or not, determine how to interpret the information payload bits for example in PBCHs.

Figure 3:
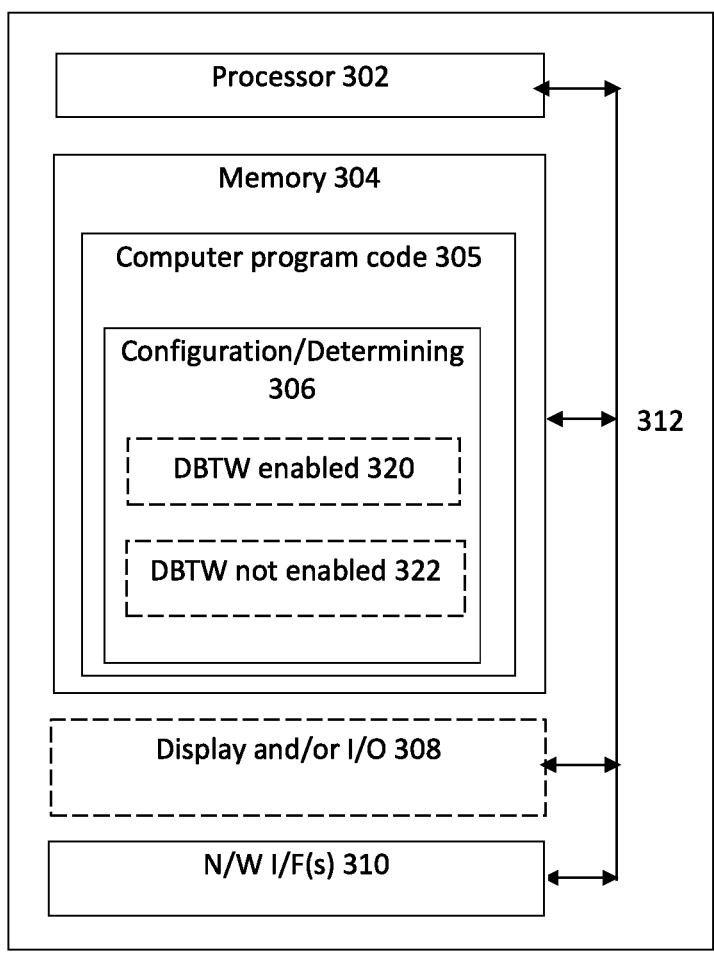
FIG. 3 is an apparatus configured to implement facilitating adaptive discovery burst time window configuration, based on the examples described herein.

FIG. 3 is an example apparatus 300, which may be implemented in hardware, configured to implement the examples described herein. The apparatus 300 comprises a processor 302, at least one non-transitory or transitory memory 304 including computer program code 305, wherein the at least one memory 304 and the computer program code 305 are configured to, with the at least one processor 302, cause the apparatus 300 to implement circuitry, a process, component, module, or function (collectively configuration/determining 306) to implement facilitating adaptive discovery burst time window configuration. The configuration 306 and determining 306 includes circuitry configured to provide a configuration for enabling DBTW 320 for an SSB or to determine whether DBTW is enabled 320 for an SSB, or to provide a configuration for not enabling DBTW 322 or to determine whether DBTW is not enabled 322 for an SSB. Items 320 and 322 may be implemented within the same circuit (e.g. as one block).

The apparatus 300 optionally includes a display and/or I/O interface 308 that may be used to display aspects or a status of the methods described herein (e.g., as one of the methods is being performed or at a subsequent time). The apparatus 300 includes one or more network (N/W) interfaces (I/F(s)) 310. The N/W I/F(s) 310 may be wired and/or wireless and communicate over the Internet/other network(s) via any communication technique. The N/W I/F(s) 310 may comprise one or more transmitters and one or more receivers. The N/W I/F(s) 30 may comprise standard well-known components such as an amplifier, filter, frequency-converter, (de)modulator, and encoder/decoder circuitries and one or more antennas.

The apparatus 300 may be UE 110, RAN node 170 or network element(s) 190 (e.g. to implement the functionality of the configuration 306). Thus, processor 302 may correspond respectively to processor(s) 120, processor(s) 152 or processor(s) 175, memory 304 may correspond respectively to memory(ies) 125, memory(ies) 155 or memory(ies) 171, computer program code 305 may correspond respectively to computer computer program code 123, module 140-1, module 140-2, or computer program code 153, module 150-1, module 150-2, or computer program code 173, and N/W I/F(s) 410 may correspond respectively to N/W I/F(s) 161 or N/W I/F(s) 180. Alternatively, apparatus 300 may not correspond to either of UE 110, RAN node 170 or network element(s) 190, as apparatus 300 may be part of a self-organizing/optimizing network (SON) node, such as in a cloud. The apparatus 300 may also be distributed throughout the network 300 including within and between apparatus 300 and any one of the network element(s) (190) (such as a network control element (NCE)) and/or the RAN node 170 and/or the UE 110.

Interface 312 enables data communication between the various items of apparatus 300, as shown in FIG. 3. Interface 312 may be one or more buses, or interface 312 may be one or more software interfaces configured to pass data between the items of apparatus 300. For example, the interface 312 may be one or more buses such as address, data, or control buses, and may include any interconnection mechanism, such as a series of lines on a motherboard or integrated circuit, fiber optics or other optical communication equipment, and the like. The apparatus 300 need not comprise each of the features mentioned, or may comprise other features as well.

FIG. 4 is an example method 400 to implement facilitating adaptive discovery burst time window configuration, based on the example embodiments described herein. At 402, the method includes detecting at least one synchronization signal and physical broadcast channel block during searching for a synchronization signal associated with a cell in a communication network. At 404, the method includes determining a configuration related to whether or not a discovery burst transmission window is used for the cell. At 406, the method includes determining, based on the configuration, whether or not the discovery burst transmission window is used for the cell. At 408, the method includes determining at least one assumption to use when monitoring and detecting the synchronization signal and physical broadcast channel block, based on whether or not the discovery burst transmission window is used for the cell. Method 400 may be performed by apparatus 300, UE 110, or a combination of those.

FIG. 5 is an example method 500 to implement facilitating adaptive discovery burst time window configuration, based on the example embodiments described herein. At 502, the method includes providing at least one synchronization signal and physical broadcast channel block or signaling used to search for a synchronization signal associated with a cell in a communication network. At 504, the method includes providing a configuration related to whether or not a discovery burst transmission window is used for the cell. At 506, the method includes wherein the configuration is used in a determination of whether or not the discovery burst transmission window is used for the cell. At 508, the method includes wherein the configuration is used in a determination of at least one assumption to use for a monitoring and a detection of the synchronization signal and physical broadcast channel block. Method 500 may be performed by apparatus 300, radio node 170, network element(s) 190, within the physical layer of communication network 100 of FIG. 1, or a combination of those.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memory(ies) as described herein may be implemented using any suitable data storage technology, such as semiconductor based memory devices, flash memory, magnetic memory devices and systems, optical memory devices and systems, non-transitory memory, transitory memory, fixed memory and removable memory. The memory(ies) may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An example method includes detecting at least one synchronization signal and physical broadcast channel block during searching for a synchronization signal associated with a cell in a communication network; determining a configuration related to whether or not a discovery burst transmission window is used for the cell; determining, based on the configuration, whether or not the discovery burst transmission window is used for the cell; and determining at least one assumption to use when monitoring and detecting the synchronization signal and physical broadcast channel block, based on whether or not the discovery burst transmission window is used for the cell.

The method may further include wherein the configuration comprises at least one synchronization raster position of at least one synchronization raster being allocated separately in frequency when the discovery burst transmission window is used for the cell and when the discovery burst transmission window is not used for the cell; determining, based on the at least one synchronization raster position within the at least one synchronization signal and physical broadcast channel block, whether or not the discovery burst transmission window is used for the cell.

The method may further include wherein the configuration comprises being provided for an unlicensed band or a licensed band to the at least one synchronization raster; wherein a first set of the at least one synchronization raster position is used when the discovery burst transmission window is used for the cell; and wherein a second set of the at least one synchronization raster position is used when the discovery burst transmission window is not used for the cell.

The method may further include wherein the at least one synchronization raster position is identified with a global synchronization channel number.

The method may further include wherein the configuration comprises a mapping between at least one resource element index of the at least one synchronization signal and physical broadcast channel block and a respective at least one global synchronization channel number location; wherein a first one of the at least one global synchronization channel number location is associated with the discovery burst transmission window being used for the cell; and wherein a second one of the at least one global synchronization channel number location is associated with the discovery burst transmission window not being used for the cell.

The method may further include wherein the first one of the at least one global synchronization channel number location is in a middle of the at least one synchronization signal and physical broadcast channel block; and wherein the second one of the at least one global synchronization channel number location is in an edge of the at least one synchronization signal and physical broadcast channel block.

The method may further include wherein the at least one resource element index is a subcarrier number of a synchronization signal and physical broadcast channel block.

The method may further include wherein the configuration comprises at least one synchronization signal and physical broadcast channel block to control resource set number zero starting physical resource block offset being associated to the case that the discovery burst transmission window is enabled; wherein the configuration comprises the at least one synchronization signal and physical broadcast channel block to control resource set number zero starting physical resource block offset being associated to the case that the discovery burst transmission window is not used for the at least one synchronization signal and physical broadcast channel block; and the method further comprising determining whether or not the discovery burst transmission window is used for the cell following detection of the at least one synchronization signal and physical broadcast channel block.

The method may further include wherein determining the configuration comprises determining at least one synchronization signal and physical broadcast channel block offset value in a physical broadcast channel, wherein a subset of the at least one synchronization signal and physical broadcast channel block offset value is used to indicate that the discovery burst transmission window is used for the cell.

The method may further include wherein determining the configuration further comprises determining, for operation at shared spectrum access, for band operation at a given frequency, that the discovery burst transmission window is not used for the cell when the at least one synchronization signal and physical broadcast channel block offset value is greater than an amount relative to a subcarrier zero in a common resource block.

The method may further include wherein a subset of the at least one synchronization signal and physical broadcast channel block offset value is used to indicate that the discovery burst transmission window is not used for the cell.

The method may further include wherein the configuration comprises at least one control resource set type zero physical downlink control channel configuration index in a physical broadcast channel associated either to the discovery burst transmission window being in use or not being in use; wherein the determining of whether or not the discovery burst transmission window is used for the cell is based on the configuration index.

The method may further include wherein a first subset of the at least one control resource set type zero physical downlink control channel configuration index is associated with the discovery burst transmission window being in use; and wherein a second subset of the at least one control resource set type zero physical downlink control channel configuration index is associated with the discovery burst transmission window not being in use.

The method may further include wherein the configuration comprises: a half-frame indication being omitted for operation for at least one frequency band, wherein at least one location of the at least one synchronization signal and physical broadcast channel block is assumed to be within a predetermined half frame; and an adapted half-frame bit in a physical broadcast channel payload that indicates whether or not the discovery burst transmission window is used for the cell.

The method may further include wherein the at least one frequency band is an unlicensed band or a licensed band.

The method may further include wherein the configuration comprises: a common sub-carrier spacing indication being omitted for a frequency band operation, wherein sub-carrier spacing of common signals is assumed to be determined based on at least one sub-carrier spacing of the at least one synchronization signal and physical broadcast channel block; and an adapted common sub-carrier spacing indication bit in a physical broadcast channel payload that indicates whether or not the discovery burst transmission window is used for the cell.

The method may further include wherein the configuration comprises: at least one physical cell identifier being adapted to indicate whether or not the discovery burst transmission window is used; wherein a subset of the at least one physical cell identifier is assigned for the discovery burst transmission window being used or the discovery burst transmission window not being used.

The method may further include wherein the configuration comprises: at least one primary synchronization signal or at least one secondary synchronization signal being adjusted to indicate whether or not the discovery burst transmission window is used; wherein a sequence generation of the at least one primary synchronization signal in the at least one synchronization signal and physical broadcast channel block is adapted to account for discovery burst transmission window use indication; or a sequence generation of the at least one secondary synchronization signal in the at least one synchronization signal and physical broadcast channel block is adapted to account for discovery burst transmission window use indication.

The method may further include wherein the configuration comprises adjusting a cyclic shift of either the sequence generation of the at least one primary synchronization signal or the sequence generation of the at least one secondary synchronization signal.

The method may be performed by a user equipment.

The method may further include wherein a user equipment uses information related to whether or not the discovery burst transmission window is used for the cell, to adjust a search and monitoring of the synchronization signal and physical broadcast channel block.

The method may further include wherein the search and monitoring of the synchronization signal and physical broadcast channel block comprises at least one of: a number of synchronization signal and physical broadcast channel block positions; a location of synchronization signal and physical broadcast channel block time locations; or a time window duration of a possible synchronization signal and physical broadcast channel block transmission.

The method may further include wherein a user equipment uses the information of whether or not the discovery burst transmission window is used for the cell, to determine how to interpret a synchronization signal and physical broadcast channel block content/information payload.

The method may further include wherein the unlicensed band is a band restricted/intended for operation with shared spectrum channel access.

An example method includes providing at least one synchronization signal and physical broadcast channel block or signaling used to search for a synchronization signal associated with a cell in a communication network; providing a configuration related to whether or not a discovery burst transmission window is used for the cell; wherein the configuration is used in a determination of whether or not the discovery burst transmission window is used for the cell; and wherein the configuration is used in a determination of at least one assumption to use for a monitoring and a detection of the synchronization signal and physical broadcast channel block.

The method may further include wherein the configuration comprises at least one synchronization raster position of at least one synchronization raster being allocated separately in frequency when the discovery burst transmission window is used for the cell and when the discovery burst transmission window is not used for the cell.

The method may further include wherein the configuration comprises providing a user equipment for an unlicensed band or a licensed band to the at least one synchronization raster; wherein a first set of the at least one synchronization raster position is used when the discovery burst transmission window is used for the cell; and wherein a second set of the at least one synchronization raster position is used when the discovery burst transmission window is not used for the cell.

The method may further include wherein the at least one synchronization raster position is identified with a global synchronization channel number.

The method may further include wherein the configuration comprises a mapping between the at least one resource element index of the at least one synchronization signal and physical broadcast channel block and a respective at least one global synchronization channel number location; wherein a first one of the at least one global synchronization channel number location is associated with the discovery burst transmission window being used for the cell; and wherein a second one of the at least one global synchronization channel number location is associated with the discovery burst transmission window not being used for the cell.

The method may further include wherein the first one of the at least one global synchronization channel number location is in a middle of the at least one synchronization signal and physical broadcast channel block; and wherein the second one of the at least one global synchronization channel number location is in an edge of the at least one synchronization signal and physical broadcast channel block.

The method may further include wherein the at least one resource element index is a subcarrier number of a synchronization signal and physical broadcast channel block.

The method may further include wherein the configuration comprises at least one synchronization signal and physical broadcast channel block to control resource set number zero starting physical resource block offset being associated to the case that the discovery burst transmission window is enabled; and wherein the configuration comprises the at least one synchronization signal and physical broadcast channel block to control resource set number zero starting physical resource block offset being associated to the case that the discovery burst transmission window is not used for the at least one synchronization signal and physical broadcast channel block.

The method may further include wherein the configuration comprises at least one synchronization signal and physical broadcast channel block offset value in the physical broadcast channel, wherein a subset of the at least one synchronization signal and physical broadcast channel block offset value is used to indicate that the discovery burst transmission window is used for the cell.

The method may further include wherein the configuration further comprises, for operation at shared spectrum access, for band operation at a given frequency, that the discovery burst transmission window is not used for the cell when the at least one synchronization signal and physical broadcast channel block offset value is greater than an amount relative to a subcarrier zero in a common resource block.

The method may further include wherein a subset of the at least one synchronization signal and physical broadcast channel offset value is used to indicate that the discovery burst transmission window is not used for the cell.

The method may further include wherein the configuration comprises at least one control resource set type zero physical downlink control channel configuration index in a physical broadcast channel associated either to the discovery burst transmission window being in use or not being in use.

The method may further include wherein a first subset of the at least one control resource set type zero physical downlink control channel configuration index is associated with the discovery burst transmission window being in use; and wherein a second subset of the at least one control resource set type zero physical downlink control channel configuration index is associated with the discovery burst transmission window not being in use.

The method may further include wherein the configuration comprises: a half-frame indication being omitted for operation for at least one frequency band, wherein at least one location of the at least one synchronization signal and physical broadcast channel block is assumed to be within a predetermined half frame; and an adapted half-frame bit in a physical broadcast channel payload that indicates whether or not the discovery burst transmission window is used for the cell.

The method may further include wherein the at least one frequency band is an unlicensed band or a licensed band.

The method may further include wherein the configuration comprises: a common sub-carrier spacing indication being omitted for a frequency band operation, wherein sub-carrier spacing of common signals is assumed to be determined based on at least one sub-carrier spacing of the at least one synchronization signal and physical broadcast channel block; and an adapted common sub-carrier spacing indication bit in a physical broadcast channel payload that indicates whether or not the discovery burst transmission window is used for the cell.

The method may further include wherein the configuration comprises: at least one physical cell identifier being adapted to indicate whether or not the discovery burst transmission window is used; wherein a subset of the at least one physical cell identifier is assigned for use of the discovery burst transmission window.

The method may further include wherein the configuration comprises: at least one primary synchronization signal or at least one secondary synchronization signal being adjusted to indicate whether or not the discovery burst transmission window is used; wherein a sequence generation of the at least one primary synchronization signal in the at least one synchronization signal and physical broadcast channel block is adapted to account for discovery burst transmission window use indication; or a sequence generation of the at least one secondary synchronization signal in the at least one synchronization signal and physical broadcast channel block is adapted to account for discovery burst transmission window use indication.

The method may further include wherein the configuration comprises adjusting a cyclic shift of either the sequence generation of the at least one primary synchronization signal or the sequence generation of the at least one secondary synchronization signal.

The method may further include may be implemented in a physical layer of the communication network.

The method may further include wherein information related to whether or not the discovery burst transmission window is used for the cell is used to adjust a search and monitoring of the synchronization signal and physical broadcast channel block.

The method may further include wherein the search and monitoring of the synchronization signal and physical broadcast channel block comprises at least one of: a number of synchronization signal and physical broadcast channel block positions; a location of synchronization signal and physical broadcast channel block time locations; or a time window duration of a possible synchronization signal and physical broadcast channel block transmission.

The method may further include wherein the information of whether or not the discovery burst transmission window is used for the cell is used to determine how to interpret a synchronization signal and physical broadcast channel block content/information payload.

The method may further include wherein the unlicensed band is a band restricted/intended for operation with shared spectrum channel access.

An example apparatus includes at least one processor; and at least one non-transitory memory including computer program code; wherein the at least one memory and the computer program code are configured to, with the at least one processor, cause the apparatus at least to: detect at least one synchronization signal and physical broadcast channel block during searching for a synchronization signal associated with a cell in a communication network; determine a configuration related to whether or not a discovery burst transmission window is used for the cell; determine, based on the configuration, whether or not the discovery burst transmission window is used for the cell; and determine at least one assumption to use when monitoring and detecting the synchronization signal and physical broadcast channel block, based on whether or not the discovery burst transmission window is used for the cell.

An example apparatus includes at least one processor; and at least one non-transitory memory including computer program code; wherein the at least one memory and the computer program code are configured to, with the at least one processor, cause the apparatus at least to: provide at least one synchronization signal and physical broadcast channel block or signaling used to search for a synchronization signal associated with a cell in a communication network; provide a configuration related to whether or not a discovery burst transmission window is used for the cell; wherein the configuration is used in a determination of whether or not the discovery burst transmission window is used for the cell; and wherein the configuration is used in a determination of at least one assumption to use for a monitoring and a detection of the synchronization signal and physical broadcast channel block.

An example apparatus includes means for detecting at least one synchronization signal and physical broadcast channel block during searching for a synchronization signal associated with a cell in a communication network; means for determining a configuration related to whether or not a discovery burst transmission window is used for the cell; means for determining, based on the configuration, whether or not the discovery burst transmission window is used for the cell; and means for determining at least one assumption to use when monitoring and detecting the synchronization signal and physical broadcast channel block, based on whether or not the discovery burst transmission window is used for the cell.

An example apparatus includes means for providing at least one synchronization signal and physical broadcast channel block or signaling used to search for a synchronization signal associated with a cell in a communication network; means for providing a configuration related to whether or not a discovery burst transmission window is used for the cell; wherein the configuration is used in a determination of whether or not the discovery burst transmission window is used for the cell; and wherein the configuration is used in a determination of at least one assumption to use for a monitoring and a detection of the synchronization signal and physical broadcast channel block.

An example non-transitory program storage device readable by a machine, tangibly embodying a program of instructions executable by the machine for performing operations is provided, the operations comprising: detecting at least one synchronization signal and physical broadcast channel block during searching for a synchronization signal associated with a cell in a communication network; determining a configuration related to whether or not a discovery burst transmission window is used for the cell; determining, based on the configuration, whether or not the discovery burst transmission window is used for the cell; and determining at least one assumption to use when monitoring and detecting the synchronization signal and physical broadcast channel block, based on whether or not the discovery burst transmission window is used for the cell.

An example non-transitory program storage device readable by a machine, tangibly embodying a program of instructions executable by the machine for performing operations is provided, the operations comprising: providing at least one synchronization signal and physical broadcast channel block or signaling used to search for a synchronization signal associated with a cell in a communication network; providing a configuration related to whether or not a discovery burst transmission window is used for the cell; wherein the configuration is used in a determination of whether or not the discovery burst transmission window is used for the cell; and wherein the configuration is used in a determination of at least one assumption to use for a monitoring and a detection of the synchronization signal and physical broadcast channel block.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, this description is intended to embrace all such alternatives, modifications and variances which fall within the scope of the appended claims.

The following acronyms and abbreviations that may be found in the specification and/or the drawing figures are defined as follows:

3GPP third generation partnership project
4G fourth generation
5G fifth generation
5GC 5G core network
802.11x part of the IEEE 802 set of local area network (LAN) technical standards
AMF access and mobility management function
ASIC application-specific integrated circuit
BM beam management
BPSK binary phase shift keying
BWP bandwidth part
Cat. category
CCA clear channel assessment
CCE control channel element
CORESET control resource set
CRB common resource block
CSI channel state information
CSS common search space
CU central unit or centralized unit
DB discovery burst
DBTW discovery burst transmission window
DCI downlink control information
DL downlink
DMRS or DM-RS demodulation reference signal
DSP digital signal processor
DU distributed unit
ED energy detection eNB evolved Node B (e.g., an LTE base station)

EN-DC E-UTRA-NR dual connectivity en-gNB node providing NR user plane and control plane protocol terminations towards the UE, and acting as a secondary node in EN-DC E-UTRA evolved universal terrestrial radio access, i.e., the LTE radio access technology F1 control interface between the CU and the DU FFS for further study FFT fast fourier transform FPGA field-programmable gate array FR frequency range FR #frequency range # gNB base station for 5G/NR, i.e., a node providing NR user plane and control plane protocol terminations towards the UE, and connected via the NG interface to the 5GC GSCN global synchronization channel number HARQ hybrid automatic repeat request ID identifier IEEE Institute of Electrical and Electronics Engineers I/F interface I/O input/output ITS intelligent transport/transportation systems/service LBT listen before talk Lmax maximum number of candidate SSBs LMF location management function LS liaison statement LSB least significant bit(s)

LTE long term evolution (4G)

MAC medium access control

MIB master information block

MME mobility management entity

MSB most significant bit(s)

M-sequence maximum-length sequence(s)

n #bands in NR defined with prefix of "n"

NCE network control element

NCP normal cyclic prefix ng or NG new generation ng-eNB new generation eNB

NG-RAN new generation radio access network

NR new radio (5G)

NR-U 5G NR in unlicensed spectrum

N/W network

PBCH physical broadcast channel

PCID physical cell ID

PDA personal digital assistant

PDCCH physical downlink control channel

PDCP packet data convergence protocol

PDSCH physical downlink shared channel

PHY physical layer

PRACH physical random access channel

PRB physical resource block

PSD power spectral density

PSS primary synchronization signal

PTRS phase tracking reference signal

PUCCH physical uplink control channel

PUSCH physical uplink shared channel

Q number of beams

QCL quasi co-location

R #RAN meeting or release

RACH random access channel

RAN radio access network

RAN #RAN meeting

RAN1 radio layer 1 or RAN WG1

RAN3 radio layer 3 or RAN WG3

RAN4 radio layer 4 or RAN WG4

RB resource block

Rel or Rel- release

RMSI remaining minimum system information

RF radio frequency

RLC radio link control

RLM radio link monitoring

RO RACH occasion

RP 3GPP RAN

RRC radio resource control (protocol)

RRH remote radio head

RRM radio resource management

RU radio unit

Rx receiver or reception

SCS or scs subcarrier spacing seq sequence

SGW serving gateway

SI study item

SIB1 system information block #1

SON self-organizing/optimizing network

SRS sounding reference signal

SS synchronization signal

SSB synchronization signal and PBCH block

SSS secondary synchronization signal symb symbol

TR technical report

TRP transmission and reception point

TS technical specification

Tx transmitter or transmission

UE user equipment (e.g., a wireless, typically mobile device)

UL uplink

UPF user plane function

WG working group

WI work item

WID work item description

X2 network interface between RAN nodes and between RAN and the core network

Xn network interface between NG-RAN nodes

What is claimed is:

1. A method performed by a user equipment (UE), the method comprising:

detecting, during an initial cell search for a cell operating in a shared-spectrum frequency band above 52.6 GHz, at least one synchronization signal and a physical broadcast channel block associated with a cell in a communication network;

determining a configuration related to whether or not a discovery burst transmission window is used for the cell, wherein the configuration is determined based on a synchronization raster position at which the synchronization signal and physical broadcast channel block is detected, and wherein the configuration comprises a plurality of Global Synchronization Channel Number (GSCN) values corresponding to synchronization raster positions, wherein a first set of GSCN values is used when the discovery burst transmission window is used for the cell and a second, different set of GSCN values is used when the discovery burst transmission window is not used for the cell, the first set and the second set corresponding to distinct, non-overlapping frequency ranges each defined by a respective starting GSCN, step size, and ending GSCN;

determining, based on the configuration, whether or not the discovery burst transmission window is used for the cell by determining whether the detected synchronization raster position corresponds to the first set of GSCN values or the second set of GSCN values, and by applying a fixed mapping between the detected GSCN value and a resource element index of the synchronization signal and physical broadcast channel block, wherein the resource element index is a subcarrier number equal to 124 when the discovery burst transmission window is not used for the cell; and determining assumptions to use when monitoring and detecting the synchronization signal and physical broadcast channel block, based on whether or not the discovery burst transmission window is used for the cell, wherein the assumptions comprise:

a number of synchronization signal and physical broadcast channel block positions, a location of synchronization signal and physical broadcast channel block time locations, and a time window duration during which the synchronization signal and the physical broadcast channel block transmissions are expected to occur.

2. A user equipment (UE) comprising:

at least one processor; and at least one non-transitory memory including computer program code;

wherein the at least one memory and the computer program code are configured to, with the at least one processor, cause the UE at least to:

detect, during an initial cell search for a cell operating in a shared-spectrum frequency band above 52.6 GHz one a synchronization signal and a physical broadcast channel block associated with a cell in a communication network;

determine a configuration related to whether or not a discovery burst transmission window is used for the cell, wherein the configuration is determined based on a synchronization raster position at which the synchronization signal and physical broadcast channel block is detected, and wherein the configuration comprises a plurality of Global Synchronization Channel Number (GSCN) values corresponding to synchronization raster positions, wherein a first set of GSCN values is used when the discovery burst transmission window is used for the cell and a second, different set of GSCN values is used when the discovery burst transmission window is not used for the cell, the first set and the second set corresponding to distinct, non-overlapping frequency ranges each defined by a respective starting GSCN, step size, and ending GSCN;

determine, based on the configuration, whether or not a discovery burst transmission window is used for the cell by:

determining whether the detected synchronization raster position corresponds to the first set of GSCN values or the second set of GSCN values; and applying a fixed mapping between the detected GSCN value and a resource element index of the synchronization signal and physical broadcast channel block, wherein the resource element index is a subcarrier number equal to 124 when the discovery burst transmission window is not used for the cell; the configuration comprises:

determine assumptions to use when monitoring and detecting the synchronization signal and physical broadcast channel based on whether or not the discovery burst transmission window is used for the cell, wherein the assumptions comprise:

a number of synchronization signal and physical broadcast channel block positions, a location of synchronization signal and physical broadcast channel block time locations, and a time window duration during which the synchronization signal and the physical broadcast channel block transmissions are expected to occur.

* * * * *